United States Patent [19]
Reed, II

[11] Patent Number: 5,762,438
[45] Date of Patent: Jun. 9, 1998

[54] FIBERGLASS ROD END FITTING

[75] Inventor: Karl F. Reed, II, Birmingham, Ala.

[73] Assignee: Preformed Line Products Company, Cleveland, Ohio

[21] Appl. No.: 740,376

[22] Filed: Oct. 29, 1996

[51] Int. Cl.$^6$ ............................................. F16B 11/00
[52] U.S. Cl. .................................... 403/269; 403/265
[58] Field of Search .................................. 403/265, 266, 403/267, 268, 269

[56] References Cited

U.S. PATENT DOCUMENTS

| | | | |
|---|---|---|---|
| 1,689,281 | 10/1928 | Forssell | 403/265 |
| 2,290,249 | 7/1942 | Piperoux | 403/269 X |
| 2,347,229 | 4/1944 | Woodbury | 406/268 |
| 4,057,687 | 11/1977 | Willem | 403/267 X |
| 4,360,288 | 11/1982 | Rutledge, Jr. et al. | 403/268 |
| 4,401,396 | 8/1983 | McKay | 403/268 X |
| 4,430,018 | 2/1984 | Fischer | 403/268 |
| 4,433,933 | 2/1984 | Parsons, Jr. et al. | 403/268 |
| 4,475,839 | 10/1984 | Strandberg | 403/267 X |
| 4,494,890 | 1/1985 | Lusk | 403/267 |
| 4,585,368 | 4/1986 | Pagan | 403/266 |
| 4,597,688 | 7/1986 | Pagan | 403/265 |
| 4,653,953 | 3/1987 | Anderson et al. | 403/268 |
| 4,662,774 | 5/1987 | Morrow, Jr. | 403/266 |
| 4,822,201 | 4/1989 | Iwasaki et al. | 403/268 |
| 4,919,560 | 4/1990 | Rutledge, Jr. et al. | 403/268 |
| 5,253,946 | 10/1993 | Watkins | 403/268 |

*Primary Examiner*—Anthony Knight
*Attorney, Agent, or Firm*—Fay, Sharpe, Beall, Fagan, Minnich & McKee

[57] ABSTRACT

A rod end fitting including a hollow housing with an internal cavity for receiving a rod. The cavity includes an opening or hole through which the rod is inserted into the cavity. In operation, an epoxy or other bonding or setting agent surrounds the rod and generally fills the cavity so as to secure the rod within the housing. The internal cavity is defined as one or more frustums aligned in series. Each of the frustums is shaped from either a right circular cone or an elliptical cone.

12 Claims, 3 Drawing Sheets

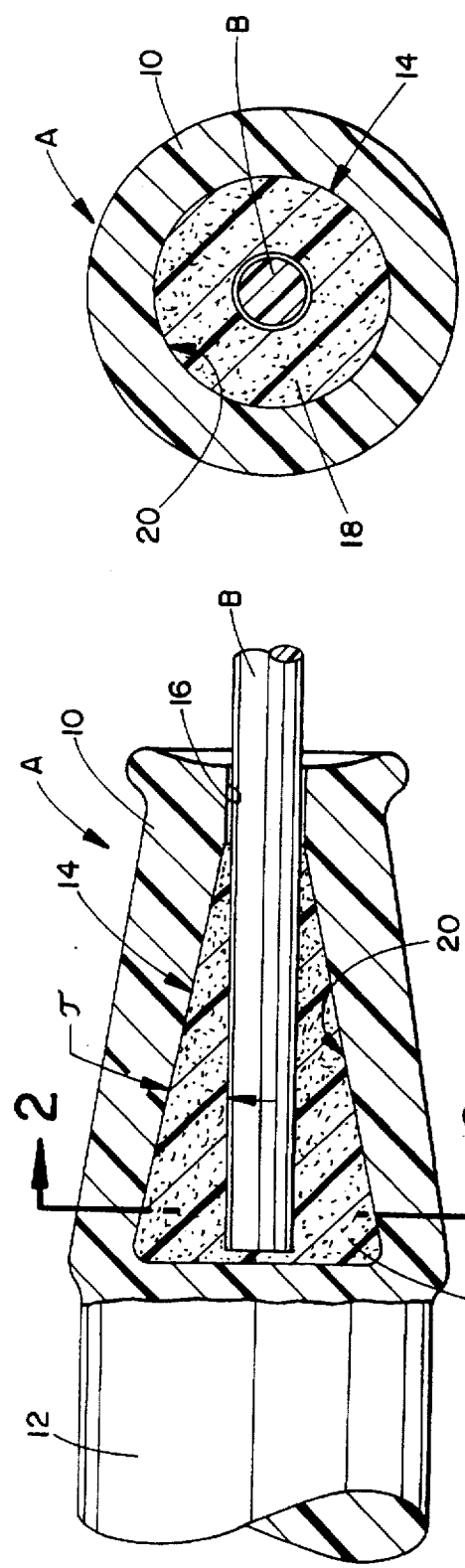
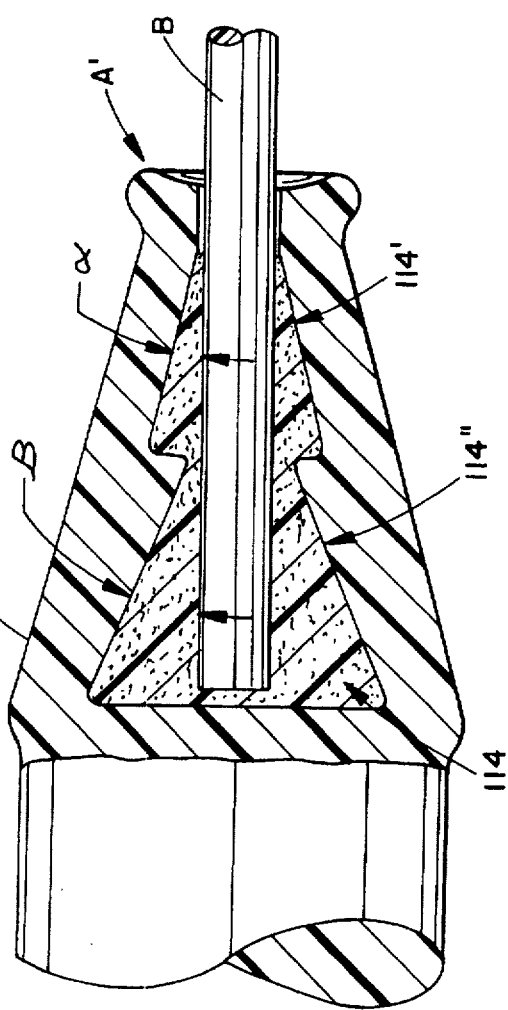

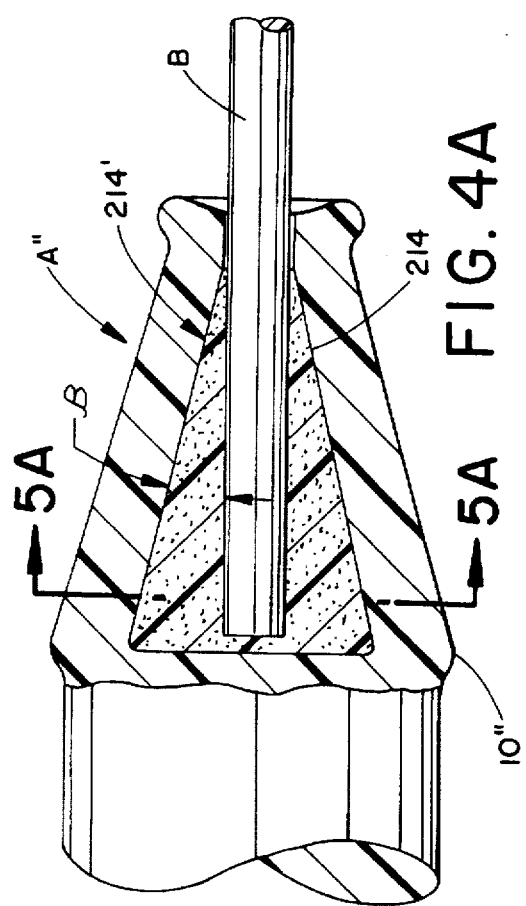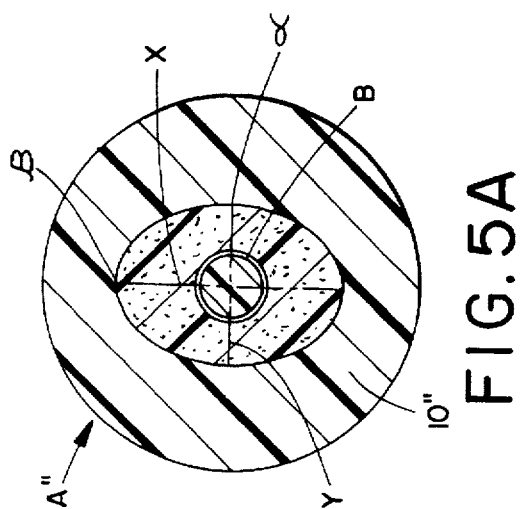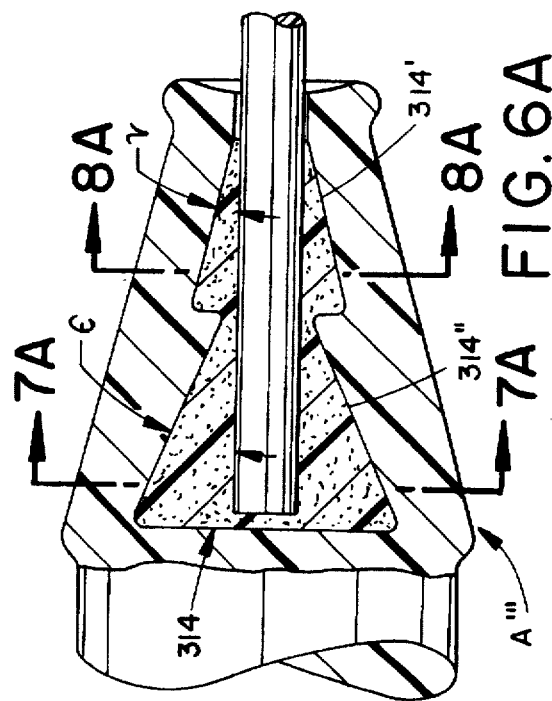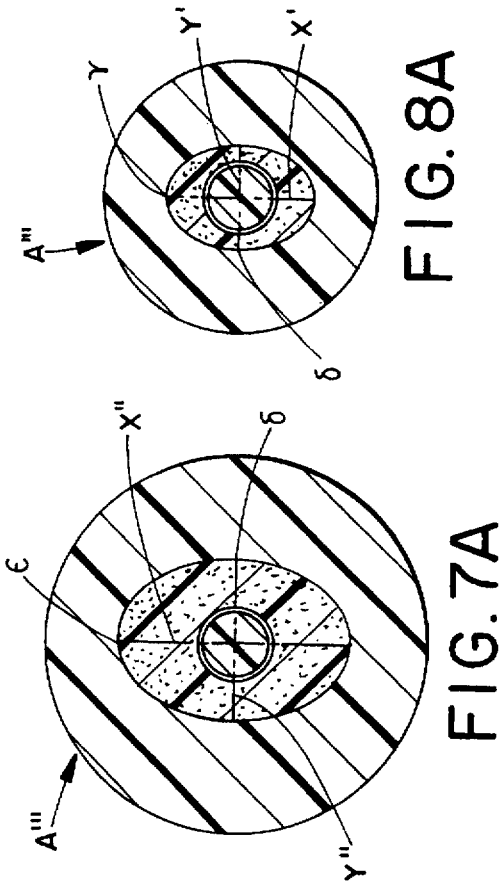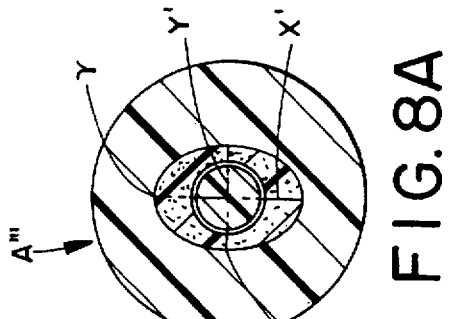

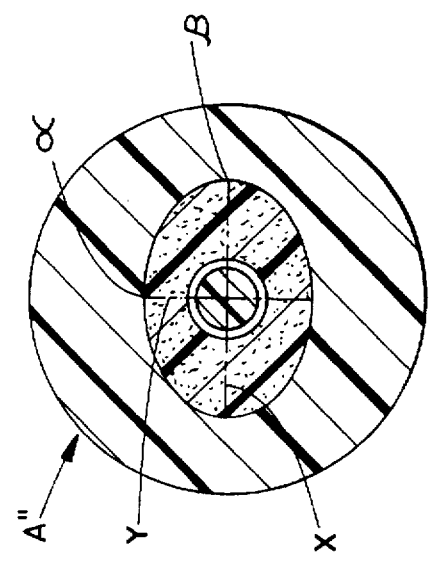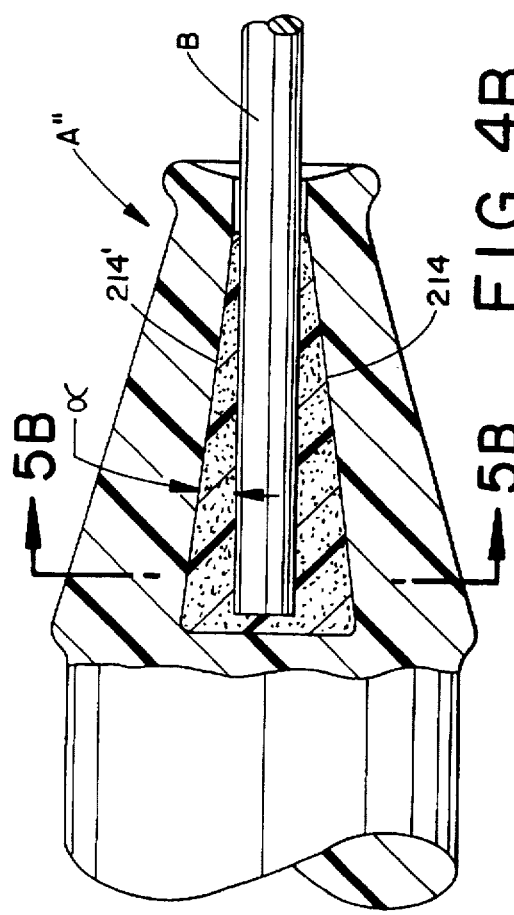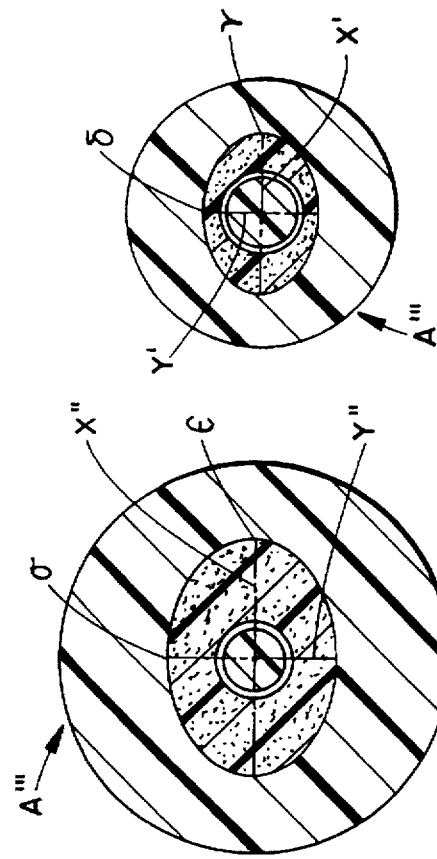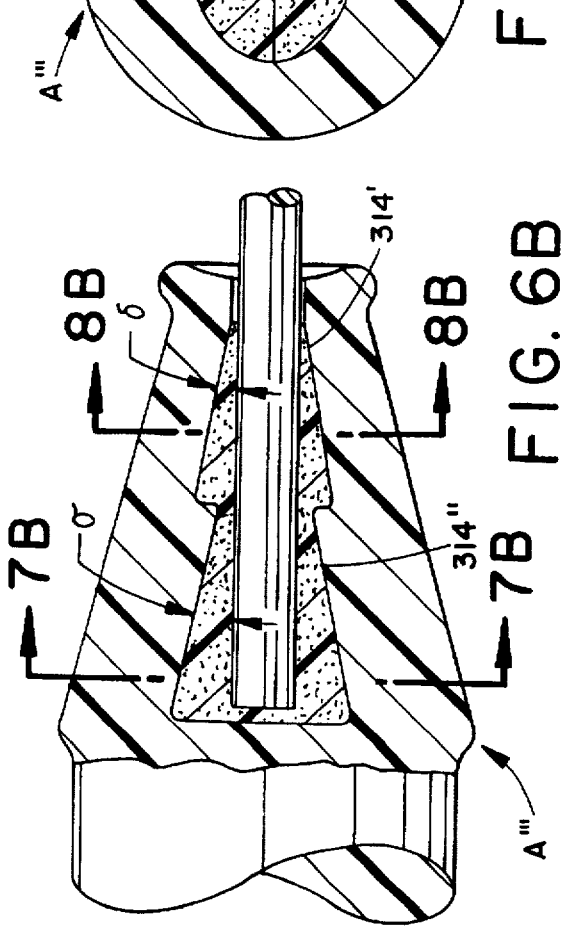

5,762,438

1

FIBERGLASS ROD END FITTING

BACKGROUND OF THE INVENTION

The subject invention is directed to the art of fittings for connecting rods together, and more particularly to fittings used for providing dead ends for guy wires, rods, and other elongated supports and electrical transmission means and the like, as well as for other applications in the electrical transmission and distribution field. Specifically, one particular use of the invention is particularly applicable to anchoring a fiberglass rod within a fitting for connection to another fiberglass rod or other component of an electrical transmission or distribution system.

Many different types of fittings for securely receiving a rod are known in the prior art, including those disclosed in U.S. Pat. Nos. 4,360,288; 4,401,396; 4,430,018; 4,475,839; 4,494,890; 4,585,368; 4,597,688; 4,662,774; 4,822,201; 4,919,560; and 5,253,946. Many of these use a tapered inner surface versus a uniform cylindrical surface for receiving the rod since a taper supplies better locking and clamping forces than a straight or uniform inner surface.

These prior fittings are satisfactory to a greater or lesser degree but often have certain disadvantages or defects which make them ineffective. For instance, many have insufficient locking and clamping forces, i.e., insufficient or limited shear strength to hold the rod within the fitting. Other designs can split the casing of the fitting and/or crush the rod. Still others, due to the circular cross section of both the rod and the inner cavity, allow undesirable rotation of the rod within the cavity.

SUMMARY OF THE INVENTION

It is, accordingly, a primary object of the subject invention to provide an improved fiberglass rod end fitting that has maximum locking and clamping forces and is designed to avoid the splitting of the casting, crushing of the rod, and rotation of the rod within the casting.

In accordance with one aspect of the invention, there is provided an end fitting connectable to the end of a cylindrical rod. The end fitting has a housing with an open end defining a hollow interior chamber is with a central axis capable of receiving a bonding agent and an end of the cylindrical rod. The hollow interior chamber is defined by at least one frusto-conical shaped cavity of non-circular cross section as taken perpendicular to the central axis.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIG. 1 is a partial sectional view of a typical prior art fiberglass rod end fitting;

FIG. 2 is a cross sectional view taken along line 2—2 in FIG. 1 of the prior art fitting;

FIG. 3 is a partial sectional view of a first embodiment of an improved fiberglass rod end fitting;

FIG. 4A is a partial sectional view of a second embodiment of an improved fiberglass rod end fitting;

FIG. 4B is a partial sectional view of the second embodiment of FIG. 4A rotated 90°;

2

FIG. 5A is a cross sectional view taken along line 5A—5A in FIG. 4A of the fitting shown therein;

FIG. 5B is a cross sectional view taken along line 5B—5B in FIG. 4B of the fitting shown therein;

FIG. 6A is a partial sectional view of a third embodiment of an improved fiberglass rod end fitting;

FIG. 6B is a partial sectional view of the third embodiment of FIG. 6A rotated 90°;

FIG. 7A is a cross sectional view taken along line 7A—7A in FIG. 6A of the fitting shown therein;

FIG. 7B is a cross sectional view taken along line 7B—7B in FIG. 6B of the fitting shown therein;

FIG. 8A is a cross sectional view taken along line 8A—8A in FIG 6A of the fitting shown therein; and, FIG. 8B is a cross sectional view taken along line 8B—8B in FIG. 6B of the fitting shown therein.

DETAILED DESCRIPTION OF THE PREFERRED EMBODIMENT

Referring now to the drawings wherein the showings are for the purposes of illustrating the preferred embodiment of the invention only and not for purposes of limiting same, the overall arrangement of the preferred construction of the rod end fitting A can best be understood by reference to a first embodiment as is shown in FIG. 3, a second embodiment as is shown in FIGS. 4A, 4B, 5A and 5B, and a third embodiment as is shown in FIGS. 6A, 6B, 7A, 7B, 8A and 8B. As illustrated therein, the rod end fitting A is capable of securely receiving and firmly holding a rod B that is positioned within one end of the fitting.

Generally, a rod end fitting A, as is shown in FIGS. 1 and 2, and known in the prior art, comprises a hollow housing 10 with a connection region 12 about one end. The hollow housing 10 is typically cast and has an internal cavity 14 for receiving rod B. The cavity 14 includes an opening or hole 16 through which the rod B is inserted into the cavity. The opening 16 is generally in an end of the housing opposed to the connection region 12. In operation, an epoxy or other bonding or setting agent 18 surrounds rod B and generally fills cavity 14 so as to secure rod B within housing 10.

An inner surface 20 of the housing 10 defines the cavity 14 as either a full right circular cone or frustum of a right circular cone whereby any cross section of the cavity is circular when taken perpendicular to the central axis as generally defined by the rod B as is shown in FIG. 2. The angle τ (tau) is referred to as the wedge angle and it defines the degree of the slope with reference to the rod B.

This wedge angle is of critical importance since any angle on the epoxy plug 18 functions to restrict or prohibit removal of the epoxy 18 and rod B from the cavity 14 of the housing or casting 10. The absence of an angle (i.e., a surface equidistant at all points from the central axis and thus at a 0° wedge angle) results in a lack of any or significant sheer strength to hold the epoxy 18 and rod B within the cavity 14.

It has been discovered that the cavity shape results in the epoxy 18 setting in to a wedge shaped epoxy plug that supplies the necessary x-y forces to hold the epoxy 18 and rod B within the cavity 14. The specific angle of the wedge determines the specific x and y forces. In general, there are competing reasons for increasing and decreasing this angle resulting in a single compromise angle between the two competing extremes that provides some of the benefits and detriments of each extreme.

A wedge angle that is too shallow will direct more forces in a radial direction resulting in damage to the rod B. In addition, too shallow of a wedge angle often results in the splitting of the casting 10. It is therefore desirable in the below described embodiments to have a wedge angle of greater than 1°, and preferentially greater than 2° or 3°.

In contrast, an angle that is too steep results in insufficient locking and clamping forces, i.e., insufficient or limited shear strength to hold the rod B within the fitting A. It is therefore desirable in the below described embodiments to have a wedge angle of less than 7°, or preferentially less than 6° or 5°.

A first embodiment of an improved fitting A' is shown in FIG. 3 (a cross section would look identical to FIG. 2). The improved fitting A' has multiple frustums or partial cones 114' and 114" of right circular conical areas aligned in series within the cavity 114. Each frustum is preferably circular in cross section. In the most preferred version of the first embodiment, the wedge angle of the first frustum 114' is not the same as the wedge angle of the second frustum 114". Specifically, the wedge angle of the first frustum is $\alpha$ (alpha), while the wedge angle of the second frustum is $\beta$ (beta).

Alternatively, various related embodiments have been contemplated including one having more than two frustums aligned in series, each frustum with either the same or differing wedge angles. In the case where more than two frustums are present and the wedge angles differ, the angles may be systematically increasing or decreasing in slope, some variation of this, or random.

A second embodiment of an improved fitting A" is shown in FIGS. 4A, 4B, 5A and 5B. The improved fitting A" has a single elliptical frustum 214' defined as the frustum of an elliptical conical area within the cavity 214. The improvement comprising an elliptical or otherwise oval cross sectional shape of the cavity 214 when viewed in a plane perpendicular to the central axis as defined by the rod B.

Specifically, this elliptical conical cavity within fitting A" is defined by combining at least two different wedge angles $\beta$ and $\alpha$ into one frustum. In more detail, the elliptical frustum 214' has an elliptical cross section when viewed in a plane perpendicular to the central axis as defined by rod B. This elliptical cross section is defined by a major axis X and a minor axis Y of differing lengths. The different critical wedge angles $\beta$ and $\alpha$ are defined as the angles between the central axis and the end of the major axis X and the minor axis Y respectively. The area of the frustum between major axis X and minor axis Y varies in slope between $\beta$ and $\alpha$.

The elliptical cross section is preferred to the circular cross section based upon the ability of the elliptical design to prohibit rotation of the rod B within the cavity 214 of the fitting A". This resistance to rotation is important because after the fitting A" has been loaded several times the epoxy may become loose and allow the rod to rotate absent this elliptical barrier.

The wedge angles $\alpha$ and $\beta$ in the first and second embodiments each critically define the cross section of the cavities 114 and 214 that define the improved fitting. These wedge angles may be any combination of angles from 0° or 90°; however, the angles preferably range from a low end of approximately 2° or 3° to a high end of approximately 6° or 7° since this is the optimum range of sufficient shear to hold the rod B within the respective housings A' and A" and limiting radial force damage to either the rod B (crushing force) and the respective castings A' and A" (splitting force).

In another preferred embodiment, one angle is at the higher end of this range such as 5° or 6°, while the other is at the lower end of this range such as 3°. As is shown in FIGS. 3, 4A, 4B, 5A, and 5B, wedge angle $\beta$ is at the higher end of this range such as 5°, while wedge angle $\alpha$ is at the lower end of this range such as 3°.

By combining at least two frusto-conical shaped areas of differing wedge angles or by creating a single frustum from an elliptical conical shaped area having two different wedge angles therein, the benefits of both a more narrow and a more steep wedge angle are combined resulting in an improved fitting that has maximum locking and clamping forces (i.e., improved shear strength) and is designed to avoid the splitting of the casting, crushing of the rod, and rotation of the rod within the casting.

A third embodiment of an improved fitting A''' is shown in FIGS. 6A, 6B, 7A, 7B, 8A, and 8B. The improved fitting A''' is a combination of the first and second embodiments. Specifically, the improved fitting A''' has multiple elliptical frustums 314' and 314" aligned in series within the cavity 314, where each frustum area is defined from an elliptical cone, i.e., it is elliptical or oval in cross section. This combination results in four critical wedge angles (i.e., two in each frustum) in contrast to the two of the first and second embodiments.

The critical major wedge angles are a result of two elliptical frustums 314' and 314" (frustums or partial cones of an elliptical conical area) aligned in series, each with two different major wedge angles or slopes therein due to the elliptical cross section thereof as defined by a major and a minor axis. Each of these elliptical frustums have an elliptical or otherwise oval cross sectional shape when viewed in a plane perpendicular to the central axis as defined by the rod B.

Specifically, this elliptical conical cavity within fitting A" is defined by combining at least two different wedge angles $\gamma$ and $\delta$, and $\epsilon$ and $\sigma$ into each of two frustums. In more detail, the two elliptical conical cavities 314' and 314" within fitting A" are defined by combining two different wedge angles $\gamma$ and $\delta$ in the first cavity or frustum 314' and two further different wedge angles $\epsilon$ and $\sigma$ in the second cavity or frustum 314". The elliptical frustums 314' and 314" have an elliptical cross section when viewed in a plane perpendicular to the central axis as defined by rod B. Each of these elliptical cross sections in frustum 314' and 314" is defined by a major axis X' or X", respectively, and a minor axis Y' or Y", respectively, of differing lengths.

The different critical wedge angles $\gamma$ and $\delta$, and $\epsilon$ and $\sigma$ in each of the two frustums 314' and 314", respectively, are defined as the angles between the central axis and the end of the major axis X' or X", respectively, and the minor axis Y' and Y", respectively. The area of the frustum between major axis X' and X", respectively, and minor axis Y' and Y", respectively, varies in slope between $\gamma$ and $\delta$, and $\epsilon$ and $\sigma$, respectively.

Alternatively, more than two sequential frustums may be present, each with either the same or differing wedge angles from the other frustums and each with either circular or elliptical cross sectional area of either the same or differing wedge angles. In the case where more than two frustums are present and the wedge angles differ between frustums, the angles may be systematically increasing or decreasing in slope, some variation of this, or random.

Similar to the first and second embodiments, the wedge angles typically vary from approximately 2° or 3° to approximately 6° or 7° as described above.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. An end fitting connectable to the end of a cylindrical rod, said fitting comprising:

a housing having a central axis and a hollow interior chamber formed therein and capable of receiving a bonding agent and a cylindrical rod through a chamber access opening formed in said housing, said hollow interior chamber substantially defined by an inner surface of generally oval cross section in a plane perpendicular to the central axis and converging toward said chamber access opening to form at least two different wedge angles with said housing central axis, whereby substantially all of an axial length of a rod inserted into said hollow interior chamber is surrounded by said converging hollow chamber.

2. The end fitting as set forth in claim 1 wherein at least a portion of the hollow interior chamber is defined in said housing to have an elliptical cross section having a major axis and a minor axis in the plane perpendicular to the central axis such that an elliptical-conical cavity is defined in said housing, said elliptical-conical cavity converging toward said chamber access opening at a first wedge angle defined between said inner surface and said central axis in the plane of the major axis and central axis, at a second wedge angle, smaller than the first wedge angle, and defined between said inner surface and said central axis in the plane of the central axis and the minor axis.

3. The end fitting as set forth in claim 2 wherein the first wedge angle of the elliptical-conical cavity is less than 10°.

4. The end fitting as set forth in claim 3 wherein the first wedge angle is between 5° and 7°.

5. The end fitting as set forth in claim 4 wherein the second wedge angle of the elliptical-conical shaped cavity is greater than 1°.

6. The end fitting as set forth in claim 5 wherein the second wedge angle is between 3° and 5°.

7. The end fitting as set forth in claim 6 wherein the hollow interior chamber comprises at least two elliptical-conical cavities in series with each other.

8. The end fitting as set forth in claim 1 wherein the hollow interior chamber comprises at least two cavities of generally oval cross section and arranged in series, each of said cavities being defined by an inner surface converging toward said chamber access opening such that at least two different wedge angles are defined in each cavity between the central axis and the inner surface defining each cavity.

9. An end fitting connectable to the end of a cylindrical rod, said fitting comprising:

a housing having a central axis, an open first end, and at least two rod and bonding agent receiving cavities in series and in communication with said open first end, each of said at least two rod receiving cavities being defined by an an inner surface of oval cross section and converging toward said open first end of said housing such that said inner surface defines each cavity to converge toward said open first end of said housing with at least two different wedge angles relative to said housing central axis.

10. An end fitting connectable to the end of a cylindrical rod, said fitting comprising:

a housing having an open end defining a hollow interior chamber with a central axis, said interior chamber capable of receiving a bonding agent and a cylindrical rod, wherein said hollow interior chamber is substantially defined by at least one arcuate surface tapered in relation to the central axis and converging toward said housing open end, said hollow interior chamber defined by said arcuate converging surface to have a non-circular cross section in a plane perpendicular to said central axis such that said tapered surface defines at least two different wedge angles with the central axis, whereby substantially all of an axial length of a rod inserted into said hollow interior chamber is surrounded by said converging hollow chamber.

11. The end fitting as set forth in claim 10 wherein the hollow interior chamber is defined in said housing to comprise first and second elliptical-conical cavities having an elliptical cross section, said cavities aligned in series and converging toward said housing open end on at least two different wedge angles.

12. A method of securing a cylindrical end of a fiber glass rod in a housing comprising:

forming a hollow interior cavity through a first end of the housing on a first axis of the housing;

shaping an axially extending inner housing surface defining said cavity to converge toward said first end of said housing and to have a generally oval cross section;

inserting a rod into said hollow interior cavity at said first housing end such that at least substantially all of an axial length of the rod inserted into the hollow interior cavity is surrounded by said converging inner housing surface; and, at least substantially filling said hollow interior cavity with a bonding agent such that said bonding agent forms a hardened wedge substantially coextensive with said inner surface and comprising a generally oval cross-section, said inner surface converging toward said housing first end on at least two different wedge angles to inhibit crushing of said rod and splitting of said housing.

* * * * *